UNITED STATES PATENT OFFICE.

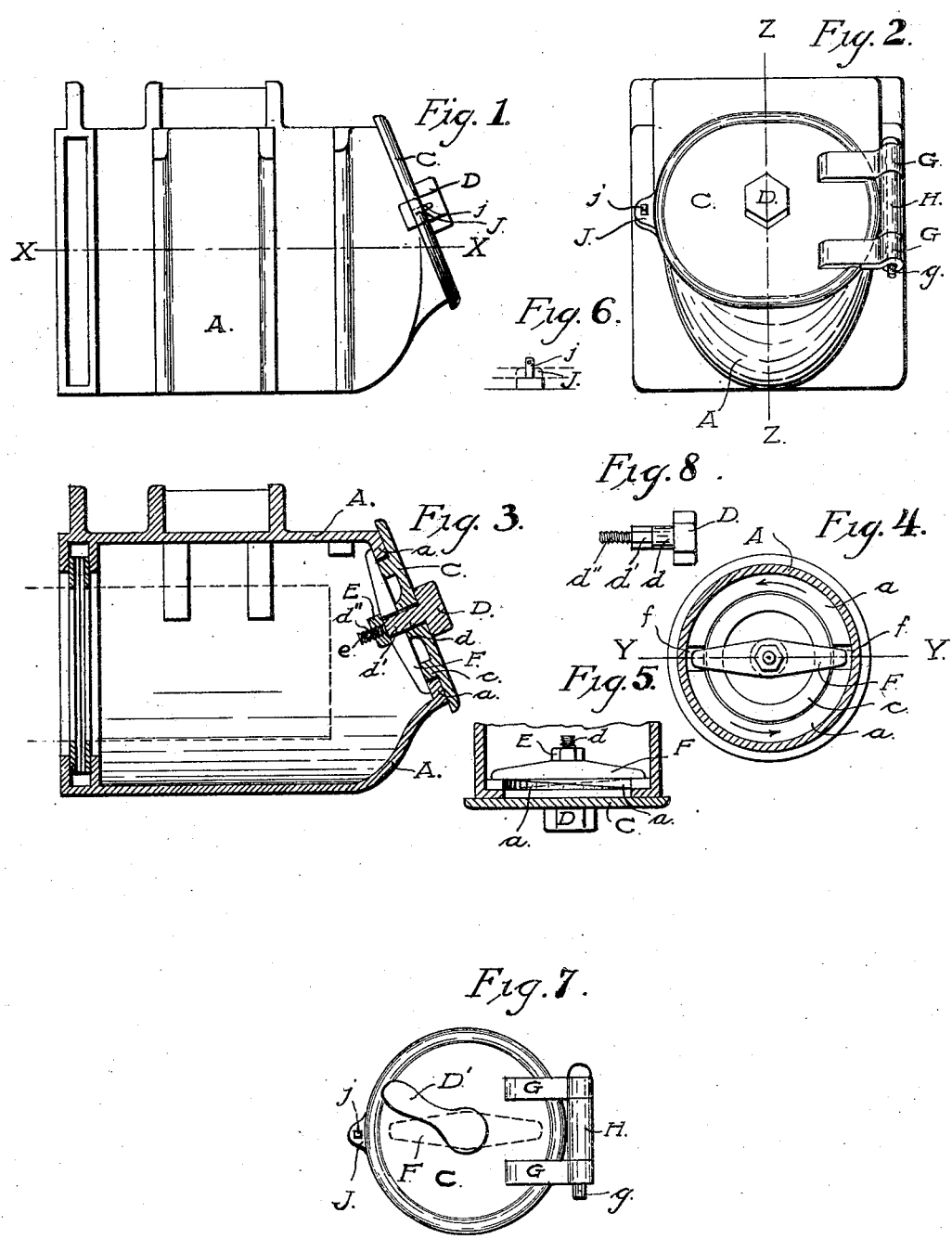

HERMAN J. KLINSMAN, OF ROCHESTER, MINNESOTA.

JOURNAL-BOX FOR RAILWAY-CARS.

No. 877,780.  Specification of Letters Patent.  Patented Jan. 28, 1908.

Application filed February 23, 1907. Serial No. 359,003.

*To all whom it may concern:*

Be it known that I, HERMAN J. KLINSMAN, a citizen of the United States of America, residing at Rochester, in the county of Olmsted and State of Minnesota, have invented certain new and useful Improvements in Journal-Boxes for Railway-Cars, of which the following is the specification.

My invention relates to improvements in lids for journal boxes for railway cars.

In order that my invention may be fully understood I will proceed to describe it with reference to the accompanying drawings in which Figure 1 is a side elevation of the journal box; Fig. 2 is a view of the outer end; Fig. 3 is a longitudinal vertical section on the line Z—Z of Fig. 2; Fig. 4 is a detail showing the inside of the cover C and accompanying parts, with the casing in section; Fig. 5 is a cross section on the line Y—Y of Fig. 4; Fig. 6 is a detail showing the fastening for locking the cover; Fig. 7 is a detail of the box cover with a handle attached; Fig. 8 is a detail of the bolt D.

Similar letters refer to similar parts throughout the several views.

The casing A of the box is formed of cast iron or other suitable material.

The outer end of the box is provided with a cover C, hinged to the casing A, by the hinge sections G, and H, and the pin $g$. The edge of the cover opposite the hinge is extended to form a lug or shoulder J, which is provided with an opening to receive the staple $j$, formed upon the boxing A. The staple $j$, is long enough to pass through the shoulder J, on the cover C, and has a small hole through its outer end through which a tin seal may be passed to seal the cover shut when desired.

The cover C, is formed with an inner circular rim $c$, which fits into a circular aperture in the outer end of the box casing A. A bolt passes through the cover C having a six sided or non-circular head D on the outside of the cover; the portion $d$ of the bolt adjacent the head D, is circular and the opposite end of the bolt, $d''$, is threaded to receive a nut E. The portion of the bolt $d'$, intermediate the threaded portion $d''$ and the circular portion $d$, is formed with several flat sides or non-circular to fit a corresponding aperture in the cross bar F. The threaded portion $d''$, of the bolt is provided with a hole $e$, to receive a spring key to lock the nut in place when desired.

The outer portion of the casing A, adjacent the circular aperture in its outer end, is ground off to form a tight joint with the cover C, the corresponding portion of which is also ground. The casing surrounding the aperture in its outer end, is provided with radial openings $f$, to admit the entrance of the arms of the cross bar F when the cover is being closed and the inner surface of the casing is provided with two semi-circular bevels $a$, (shown in Fig. 5, one in solid lines and one in dotted lines) to tighten the cover as the cross bar F is turned.

When it is desired to avoid the necessity of using a wrench to tighten or loosen the cover to such boxes, a weighted handle D', may be formed upon the bolt in place of the head D, at such an angle that the weight of the handle will tend to tighten the cross bar F upon the bevels.

It is intended to have the inner portion of the cover C and the parts of the casing with which it comes in contact ground to form a sufficiently tight joint but when desired a flat collar of metal, fiber or other material may be placed upon the inner surface of the cover around the circular rim to make a tighter joint.

What I claim as new and desire to secure by Letters Patent, is:

1. A journal box comprising a casing having a pair of semi-circular bevels formed therein, spaced apart so as to leave radial openings a hinged cover secured to the outer end of the casing, a bolt passing through the cover and revolubly mounted therein, and a cross bar rigidly secured to the bolt, and adapted to pass through the radial openings and engage the semi-circular bevels.

2. A journal box comprising a casing having an opening in its outer end and a pair of semi-circular bevels formed upon the inner side of the casing adjacent to the opening, and spaced apart so as to leave radial openings a cover hinged adjacent thereto, a bolt revolubly mounted in the center of the cover, and a cross bar rigidly secured to the inner end of the bolt and adapted to pass through the radial openings and engage the semi-circular bevels.

3. A journal box comprising a casing having a circular opening in its outer end extended on two opposite sides so as to provide radial openings and bevels formed upon the casing adjacent to the opening, a cover hinged to the casing adjacent to the opening, a bolt formed with a weighted handle and revolubly mounted in the cover and a cross bar rigidly secured to the bolt and adapted to engage the bevels.

HERMAN J. KLINSMAN.

Witnesses:
 WINNIFRED JAMES,
 A. G. BUSH.